(12) United States Patent
Kurino et al.

(10) Patent No.: US 10,338,314 B2
(45) Date of Patent: Jul. 2, 2019

(54) OPTICAL FIBER CUTTING APPARATUS

(71) Applicant: SEI OPTIFRONTIER CO., LTD., Yokohama-shi, Kanagawa (JP)

(72) Inventors: Shinsuke Kurino, Yokohama (JP); Hiroshi Takayanagi, Yokohama (JP); Yoshiyuki Nishizawa, Yokohama (JP); Masahiro Hasegawa, Yokohama (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 41 days.

(21) Appl. No.: 15/427,121

(22) Filed: Feb. 8, 2017

(65) Prior Publication Data

US 2017/0235051 A1   Aug. 17, 2017

(30) Foreign Application Priority Data

Feb. 12, 2016   (JP) ................. 2016-025135

(51) Int. Cl.
*B26D 7/26* (2006.01)
*G02B 6/25* (2006.01)
*G02B 6/00* (2006.01)

(52) U.S. Cl.
CPC ............. *G02B 6/25* (2013.01); *B26D 7/2628* (2013.01)

(58) Field of Classification Search
CPC ..................................................... G02B 6/25
USPC ............ 83/471.3, 471, 477.1–477.2; 81/9.4; 30/93–102; 385/134
See application file for complete search history.

(56) References Cited

U.S. PATENT DOCUMENTS

| 6,801,705 B2 * | 10/2004 | Sasaki ............. G02B 6/25 225/93 |
| 2006/0263028 A1 | 11/2006 | Honma |
| 2013/0075440 A1 * | 3/2013 | Hasegawa ........... G02B 6/25 225/96 |

FOREIGN PATENT DOCUMENTS

| CN | 201514495 U | 6/2010 |
| CN | 201583682 U | 9/2010 |
| CN | 102998744 A | 3/2013 |
| JP | A-H11-160547 | 6/1999 |
| JP | 2002-286944 A | 10/2002 |
| JP | 2009-244403 A | 10/2009 |
| KR | A-2009-0081179 | 7/2009 |
| KR | A-2013-0076750 | 7/2013 |
| WO | WO-2005/088370 A1 | 9/2005 |

* cited by examiner

*Primary Examiner* — Ghassem Alie
*Assistant Examiner* — Nhat Chieu Q Do
(74) *Attorney, Agent, or Firm* — Drinker Biddle & Reath LLP

(57) ABSTRACT

An optical fiber cutting apparatus includes a body portion on which an optical fiber is mounted, a cover member that is rotatably connected to the body portion and fixes the optical fiber between the body portion and the cover member by rotating toward the body portion, a blade member configured to form a flaw on a glass fiber portion of the optical fiber which is fixed, and a holding member mounted on the body portion, the holding member configured to hold the blade member. The cover member presses the holding member and thereby the blade member imparts an arc movement to form the flaw on the glass fiber portion.

5 Claims, 11 Drawing Sheets

OPTICAL FIBER CUTTING APPARATUS

CROSS-REFERENCE TO RELATED APPLICATION

The present application claims priority from Japanese Patent Application No. 2016-25135 filed on Feb. 12, 2016, the entire content of which is incorporated herein by reference.

BACKGROUND

Technical Field

The present invention relates to an optical fiber cutting apparatus which is capable of cutting a glass fiber portion of an optical fiber in a desired length.

Related Art

In recent years, there has been a growing demand for large-capacitance and high-speed information transmission, and installation of an optical fiber communication network in office buildings and in general houses is progressed. For example, in a case where the optical fiber is pulled in the house from a main line, it is necessary to connect an optical fiber on a main line side and an optical fiber on a house side. In a case where the optical fiber is connected, a glass fiber portion is exposed by removing a coating of an optical fiber end portion, the exposed glass fiber portion is cut, and the connection is performed in a state where cut fractured surfaces are butted.

As an apparatus that cuts a glass fiber portion of an optical fiber, an optical fiber cutting apparatus that attaches an initial flaw on a surface of the glass fiber portion, presses a portion to which the initial flaw is attached, develops the initial flaw, and then cuts the glass fiber portion at a position of the initial flaw is disclosed in Patent Documents 1 to 3.

PRIOR ART DOCUMENT

Patent Document

[Patent Document 1] JP-A-2009-244403
[Patent Document 2] JP-A-2002-286944
[Patent Document 3] International Publication No. WO2005/088370

For example, in Patent Document 1, a cutting operation of an optical fiber is performed through three steps in which (1) a holder gripping the optical fiber is set in a recessed groove, (2) a lid of the optical fiber cutting apparatus is closed, and (3) an operation lever is operated. In addition, in Patent Document 2, if operations are performed in which (1) a blade member is slide-moved, is moved to a position exceeding a flaw forming position to be fixed, (2) a fiber holder gripping an optical fiber is set in a fiber mounting portion, and (3) an upper case is closed, a support frame that supports the blade member is returned to an original position at once by a biasing force of a spring member. Therefore, the blade member comes into contact with a glass fiber portion of the optical fiber, and forms a flaw. Furthermore, in Patent Document 3, if operations are performed in which (1) a slider that holds a blade member is locked to a holding member by being pressed to a locking position, (2) a glass fiber portion of an optical fiber is disposed at a predetermined position, and (3) locking of the slider with respect to the holding member is released by pressing the holding member by an upper case, the blade member comes into contact with the glass fiber portion of the optical fiber and forms a flaw when the slider returns to an original position, and furthermore, a fracturing member is lowered and presses the glass fiber portion, and (4), finally, if a hand pressing the upper case is released, the upper case is opened by an elastic member.

As described above, in the optical fiber cutting apparatus disclosed in Patent Documents 1 to 3, it is necessary to provide a process of at least three steps from setting of the optical fiber to the apparatus to the completion of the cutting of the glass fiber portion, and mechanisms of the optical fiber cutting apparatus are complicated.

SUMMARY

An object of the invention is to provide an optical fiber cutting apparatus which includes a simple structure with a low cost and is capable of reducing steps during an optical fiber cutting operation.

An optical fiber cutting apparatus according to an exemplary embodiment comprises:

a body portion on which an optical fiber is mounted;

a cover member that is rotatably connected to the body portion and fixes the optical fiber between the body portion and the cover member by rotating toward the body portion;

a blade member configured to form a flaw on a glass fiber portion of the optical fiber which is fixed; and a holding member mounted on the body portion, the holding member configured to hold the blade member, wherein the cover member presses the holding member and thereby the blade member imparts an arc movement to form the flaw on the glass fiber portion.

According to the exemplary embodiment, it is possible to provide an optical fiber cutting apparatus which includes a simple structure with a low cost and is capable of reducing steps during an optical fiber cutting operation.

DETAILED DESCRIPTION

Description of Embodiments of the Invention

Figure 1:
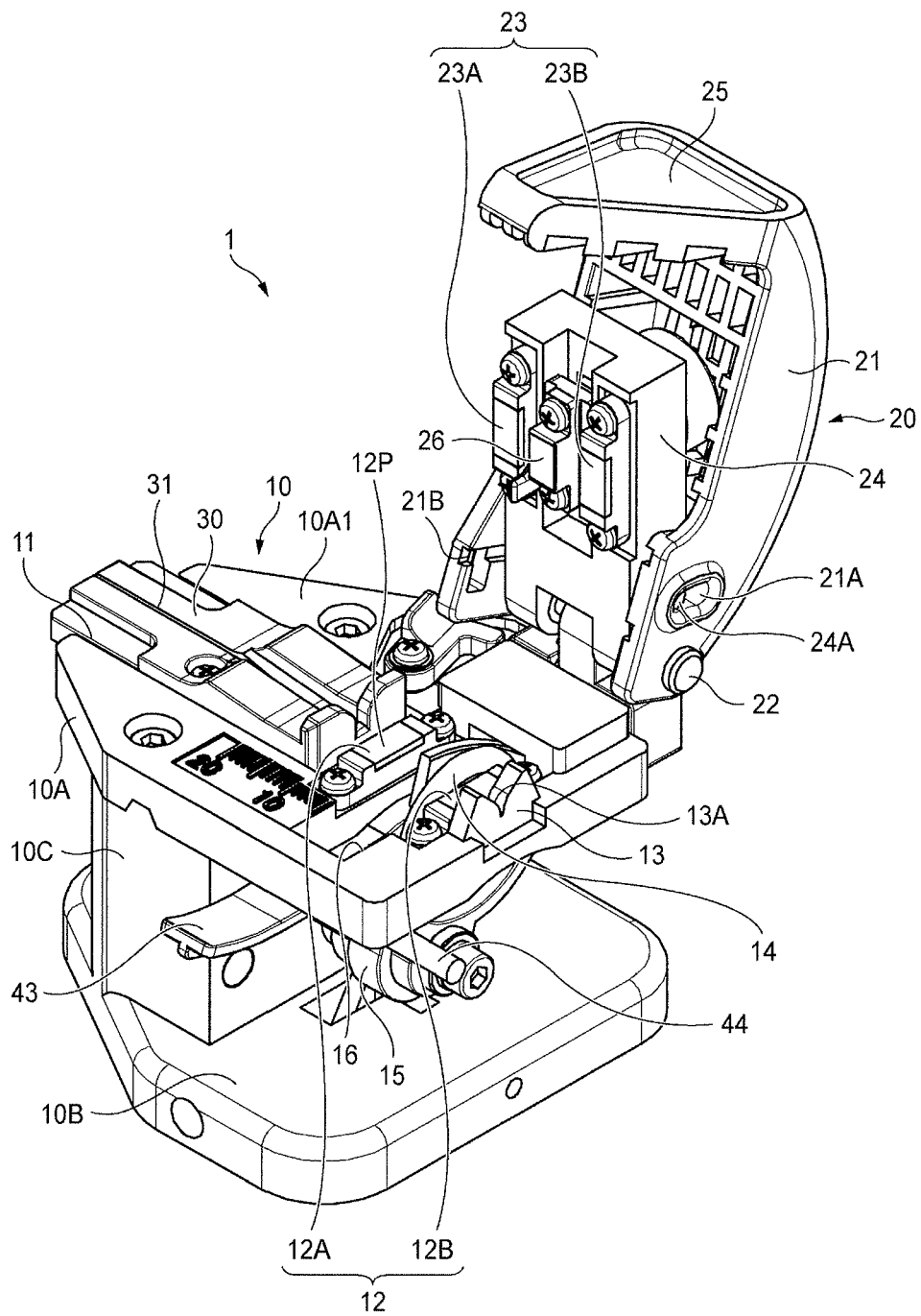
FIG. 1 is a front perspective view of an optical fiber cutting apparatus and a holder mounted thereon of an embodiment.

Initially, contents of an embodiment of the invention will be listed and described.

(1)

An optical fiber cutting apparatus according to an exemplary embodiment, comprises:

a body portion on which an optical fiber is mounted;

a cover member that is rotatably connected to the body portion and fixes the optical fiber between the body portion and the cover member by rotating toward the body portion;

a blade member configured to form a flaw on a glass fiber portion of the optical fiber which is fixed; and a holding member mounted on the body portion, the holding member configured to hold the blade member, wherein the cover member presses the holding member and thereby the blade member imparts an arc movement to form the flaw on the glass fiber portion.

According to the configuration, it is possible to fix the optical fiber between the body portion and the cover member with a simple configuration of rotating the cover member to the body portion, and to form the flaw in the glass fiber portion of the optical fiber by causing the blade member to be moved in an arc shape. Therefore, the cutting operation of the optical fiber is simplified and it is possible to shorten the cutting operation.

(2) It is preferable that the cover member includes a first protrusion portion that protrudes on the body portion side in a state where the cover member faces the body portion, and the holding member includes a second protrusion portion that is pressed by the first protrusion portion when the cover member is rotated toward the body portion According to the configuration, it is possible to perform the cutting operation of the optical fiber with a simple configuration and reduced steps.

(3) It is preferable that the body portion includes a magnet, the holding member further includes a rod member that penetrates the second protrusion portion, and the second protrusion portion is fixed to a standby position by the rod member being attached to and held by the magnet.

According to the configuration, it is possible to fix the holding member at the standby position and it is possible to prevent the glass fiber portion of the optical fiber from forming careless flaw by the arc movement of the blade member.

(4) It is preferable that the body portion includes a holder fixing portion configured to mount a holder where the optical fiber is housed thereon, a fixing member configured to fix the optical fiber between the cover member and fixing member, and an alignment portion provided to face the holder fixing portion via the fixing member, the alignment portion including a groove in which the glass fiber portion is housed.

According to the configuration, the glass fiber portion is housed in the groove of the alignment portion and thereby it is possible to dispose the glass fiber portion at an appropriate position on the body portion.

(5) It is preferable that the body portion includes a lock device configured to fix the cover member in a semi-open state.

According to the configuration, the blade member is not exposed and it is possible to safely transport the optical fiber cutting apparatus without being housed in a dedicated housing case.

Details of Embodiments of the Invention

Hereinafter, a preferred embodiment of the invention will be described in detail with reference to the drawings. Moreover, in the description of the driving, the same reference numerals are given to the same or corresponding elements and duplicated description will be omitted.

Figure 2:
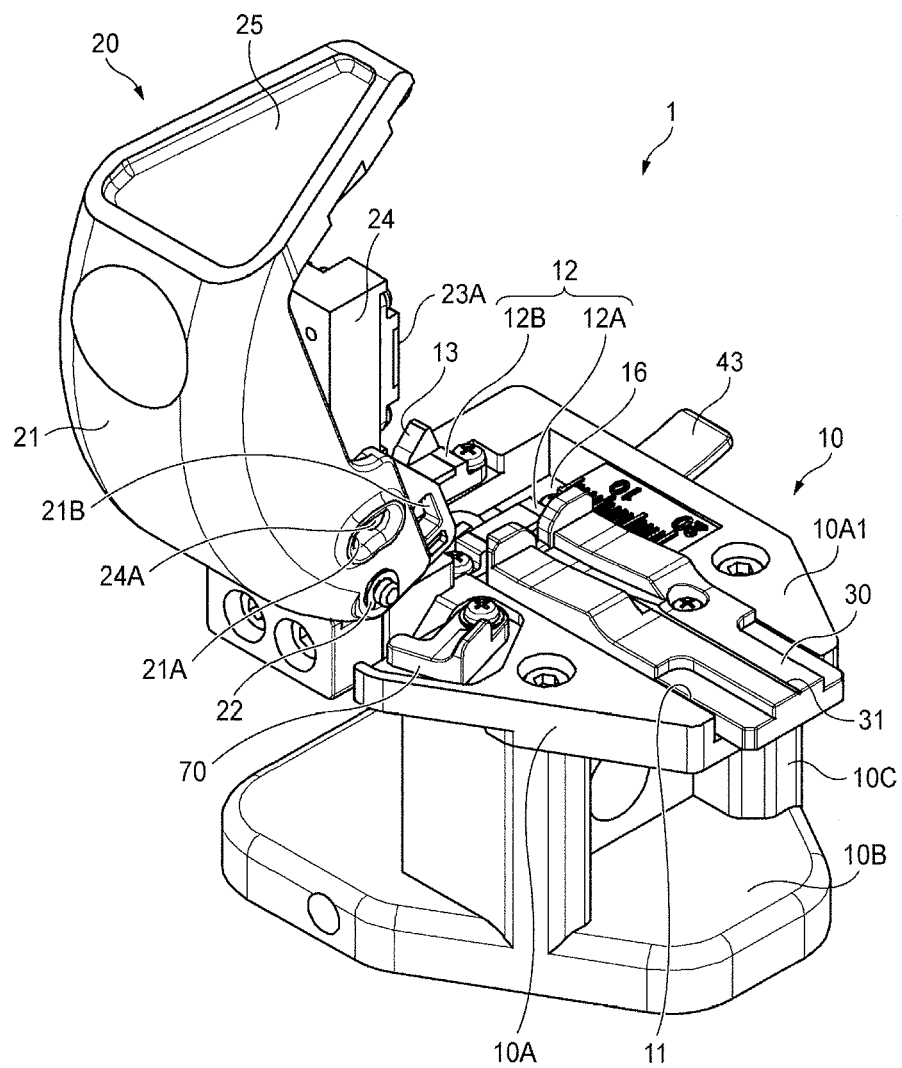
FIG. 2 is a rear perspective view of the optical fiber cutting apparatus.
Figure 3:
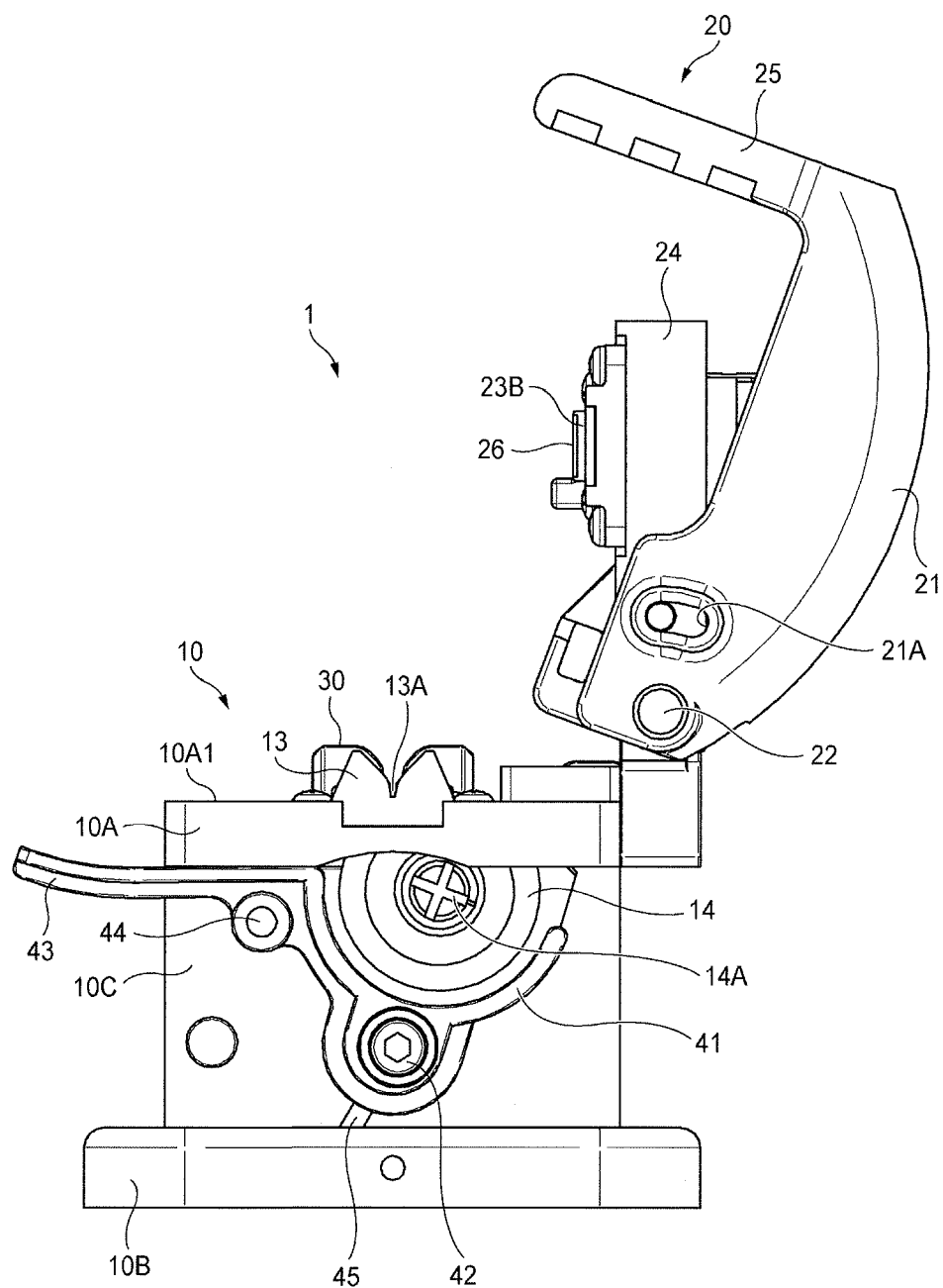
FIG. 3 is a right side view of the optical fiber cutting apparatus.

FIGS. 1 and 2 are respectively a front perspective view and a rear perspective view of an optical fiber cutting apparatus and a holder mounted thereon of an embodiment of the invention. FIG. 3 is a right side view of the optical fiber cutting apparatus.

An optical fiber cutting apparatus 1 includes a body portion 10 and a clamping cover 20. The body portion 10 has a holder fixing portion 11, a lower fixing member 12, a fiber aligning portion 13, a blade member 14, and a holding member 15. The clamping cover 20 has an arm member 21, a rotation member 22, an upper fixing member 23, a mounting member 24, a lever pressing portion 25, and a fracture member 26. A clamping portion for clamping a glass fiber portion of the optical fiber (not illustrated) is configured of the lower fixing member 12 of the body portion 10 and the upper fixing member 23 of the clamping cover 20.

The body portion 10 is configured of a top plate portion 10A, a bottom plate portion 10B, and a column portion 10C that connects the top plate portion 10A and the bottom plate portion 10B. The holder fixing portion 11 is provided on an upper surface 10A1 of the top plate portion 10A. The holder fixing portion 11 is a portion which is formed in a recessed shape for fixing a holder 30 that holds the optical fiber in a portion of a protection coating. As an example, the holder 30 has a structure in which a fiber housing groove 31, which is capable of housing a plurality of types of optical fibers of which outer diameters are different, is provided on an upper surface thereof.

The lower fixing member 12 is fixed to a position facing the clamping cover 20 on the upper surface 10A1 of the top plate portion 10A. The lower fixing member 12 is configured of a pair of lower clamping portions 12A and 12B disposed at a constant interval. Each of the lower clamping portions 12A and 12B is configured such that a rubber material is fitted in an upper surface of a metal pedestal and the glass fiber portion of the optical fiber is mounted on an upper surface (hereinafter, referred to as a clamping surface 12P) of the rubber material. The pair of lower clamping portions 12A and 12B face a pair of upper fixing members 23 which are described below and it is possible to sandwich and fix the glass fiber portion of the optical fiber by closing the clamping cover 20.

The fiber aligning portion 13 is provided on an outside of the lower clamping portion 12B of the lower fixing member 12 which is disposed on a side opposite to the holder fixing portion 11. The fiber aligning portion 13 is a member that protrudes above from the upper surface 10A1 of the top plate portion 10A and is provided with a guide groove 13A in which the glass fiber portion of the optical fiber is housed at a center portion thereof. The protection coating portion is housed in the fiber housing groove 31 of the holder 30, the exposed glass fiber portion is mounted on the lower clamping portions 12A and 12B, the tip of the glass fiber portion is housed in the guide groove 13A of the fiber aligning portion 13, and thereby the optical fiber of which the glass fiber portion having a predetermined length is exposed at a tip is disposed at an appropriate position on the top plate portion 10A.

An exposure hole 16 is formed between the pair of lower clamping portions 12A and 12B, and the blade member 14 protrudes upward from the exposure hole 16. The blade member 14 is configured such that a blade is formed around a disc and, as illustrated in FIG. 3, includes a support shaft 14A at a center thereof. The holding member 15 is a member for holding the blade member 14 via the support shaft 14A and is provided with a blade holding portion 41, a rotational shaft 42, a rotational lever 43, a metal rod 44 (an example of a rod member), and an adjusting lever 45. The support shaft 14A of the blade member 14 is mounted on the blade holding portion 41 of the holding member 15. The holding member 15 is mounted on the column portion 10C of the body portion 10 by the rotational shaft 42. The rotational lever 43 is provided so as to protrude to a side from the blade holding portion 41. The rotational lever 43 vertically moves and thereby the holding member 15 can rotate with respect to the column portion 10C of the body portion 10 around the rotational shaft 42. Therefore, the blade member 14 mounted on the blade holding portion 41 is moved in an arc shape around the rotational shaft 42 by the movement of the rotational lever 43. The rod 44 is provided so as to extend from the rotational lever 43 along a longitudinal direction of the optical fiber that is held in the holder 30 in a region of the rotational lever 43 on a blade holding portion 41 side. The adjusting lever 45 is provided so as to protrude downward from the rotational shaft 42. A method for adjusting the position of the blade member 14 with respect to a clamping portion of the optical fiber, which is performed using the adjusting lever 45, will be described later in detail.

The clamping cover 20 includes the elongated arm member 21 that is provided so as to cover a region in which the lower fixing member 12, the fiber aligning portion 13, and the blade member 14 are disposed in the top plate portion 10A of the body portion 10. The arm member 21 is rotatably connected to the body portion 10 via the rotation member 22.

The upper fixing member 23 is disposed at a position facing the lower fixing member 12 on a rear surface side of the arm member 21. The upper fixing member 23 is configured of a pair of upper clamping portions 23A and 23B disposed at a constant interval. The pair of upper clamping portions 23A and 23B are mounted on the mounting member 24. The mounting member 24 is rotatably connected to the top plate portion 10A and the arm member 21 via the rotation member 22. In addition, the mounting member 24 includes a protrusion portion 24A which is inserted into a long hole 21A provided in the arm member 21. In addition, a compression spring (not illustrated) is provided between the rear surface of the arm member 21 and the upper fixing member 23. According to the configuration, the upper fixing member 23 is capable of sliding with respect to the arm member 21 in a longitudinal direction of the long hole 21A.

The lever pressing portion 25 is provided so as to protrude toward the body portion 10 side substantially at a right angle from the arm member 21 on a side of the arm member 21 opposite to a portion in which the rotation member 22 is provided in a state where the arm member 21 is closed. The lever pressing portion 25 is formed in a trapezoidal shape (inverted triangle) of which an upper bottom is wide in width so that the rotational lever 43 of the holding member 15 can be pressed downward when rotating the arm member 21 so as to be closed. According to the configuration, when closing the clamping cover 20 with respect to the body portion 10, the rotational lever 43 is pressed downward by the lever pressing portion 25, the blade member 14 is moved in an arc shape, and it is possible to flaw the glass fiber portion of the optical fiber fixed by the lower and upper fixing member 12 and 23.

The fracture member 26 for fracturing the glass-fiber portion by developing the flaw to the glass fiber portion by the blade member 14 is provided between the upper clamping portions 23A and 23B. The fracture member 26 is a member that is fixed to the mounting member 24 and is disposed so as to slightly protrude from the upper surfaces of the upper clamping portions 23A and 23B. According to the configuration, the glass fiber portion in which the flaw is formed by the blade member 14 that is moved in an arc shape based on a downward movement of the rotational lever 43 is pressed and can be fractured by developing the flaw. The fracture member 26 is, for example, configured such that the rubber material is fitted in the upper surface of the metal pedestal. The glass fiber portion is reliably fractured from a portion which is flawed by the blade member 14 and it is possible to form a good fractured surface by being fractured by developing the flaw by the fracture member 26.

The body portion 10 and the clamping cover 20 are biased in an opening direction each other by a spring member (not illustrated) between the arm member 21 and the mounting member 24. An angle (opening angle) θ that is formed in a state where the top plate portion 10A of the body portion 10 and the clamping cover 20 are open is set appropriately at an 90 degrees, as an example. Therefore, after the cutting operation is completed, when releasing a hand from the clamping cover 20, the clamping cover 20 is automatically opened by using a biasing force of the spring member. Therefore, since it is possible to hold a state where the body portion 10 and the clamping cover 20 are opened by the biasing force of the spring member, it is easy to mount the holder 30 on the holder fixing portion 11. In addition, after the glass fiber portion is cut, it is possible to easily remove the optical fiber from the holder 30.

Figure 4:
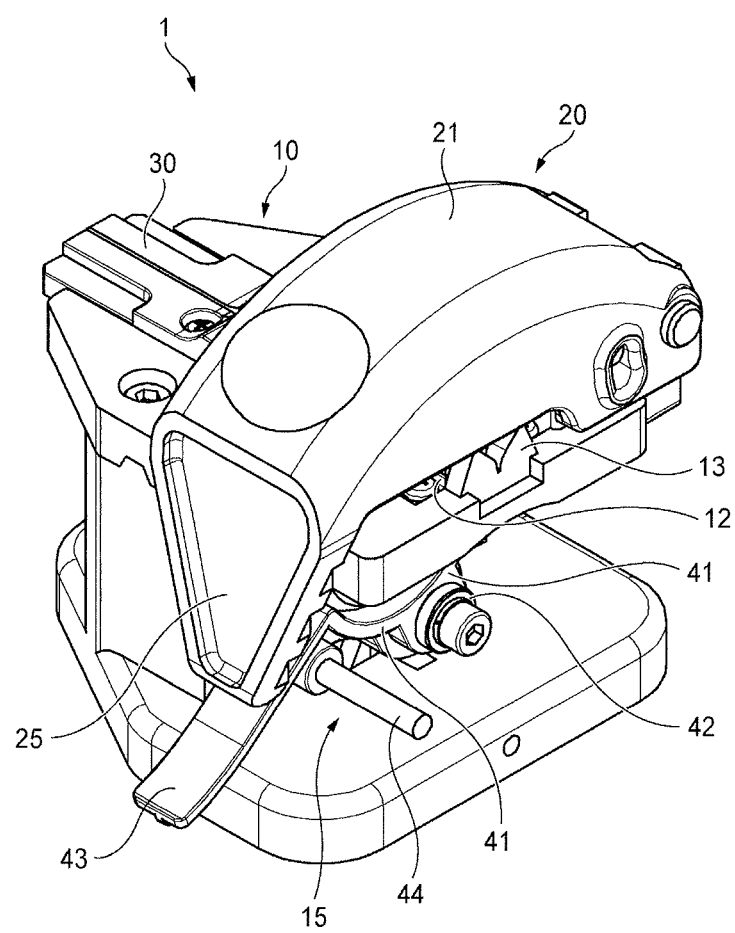
FIG. 4 is a front perspective view of a state where a clamping cover of the optical fiber cutting apparatus is closed.
Figure 5:
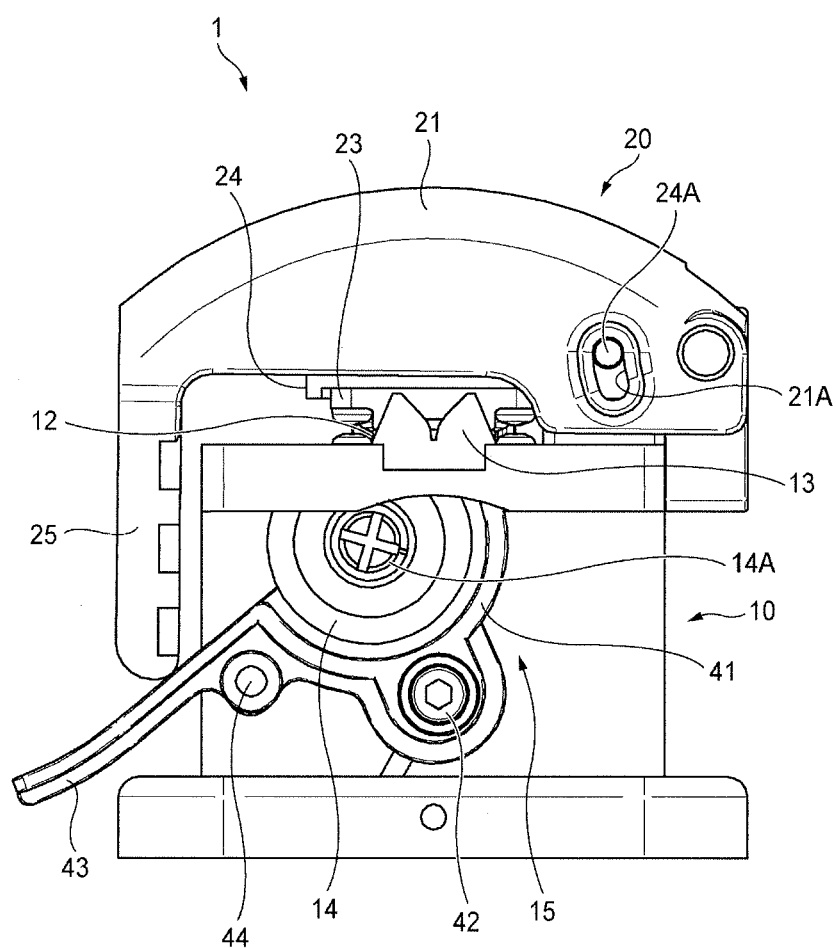
FIG. 5 is a right side view of the state illustrated in FIG. 4.

Next, an example of the operation of the optical fiber cutting apparatus 1 when cutting the glass fiber portion of the optical fiber by the optical fiber cutting apparatus 1 described above will be described with reference to FIGS. 1 to 6. FIG. 4 is a front perspective view of a state where the clamping cover 20 of the optical fiber cutting apparatus 1 is closed and FIG. 5 is a right side view of the state illustrated in FIG. 4. In addition, FIG. 6 is a bottom perspective view when the rotational lever 43 of the holding member 15 is lifted upward in a state where the clamping cover 20 is open.

First, as illustrated in FIGS. 1 to 3, an operator causes the protection coating portion of the optical fiber of which the glass fiber portion having a predetermined length is exposed at the tip to be housed in the fiber housing groove 31 of the holder 30 mounted on the holder fixing portion 11 in a case where the body portion 10 and the clamping cover 20 are open. Therefore, the operator causes the glass fiber portion of the optical fiber to be mounted on the lower clamping portions 12A and 12B and to be housed in the guide groove 13A of the fiber aligning portion 13.

In this state, when the operator rotates the clamping cover 20 (arm member 21) that is in the open state toward the body portion 10, as illustrated in FIGS. 4 and 5, the glass fiber portion of the optical fiber is sandwiched and fixed by the lower clamping portions 12A and 12B, and the upper clamping portions 23A and 23B which face each other. Therefore, the lever pressing portion 25 presses the rotational lever 43 and thereby the rotational lever 43 is moved downward. The glass fiber portion of the optical fiber fixed between the lower and upper fixing member 12 and 23 is flawed by the blade member 14 that is moved in an arc shape based on the downward movement of the rotational lever 43. Therefore, the glass fiber portion is fractured by developing the flaw by pressing the glass fiber portion in which the flaw is formed by the fracture member 26.

Figure 6:
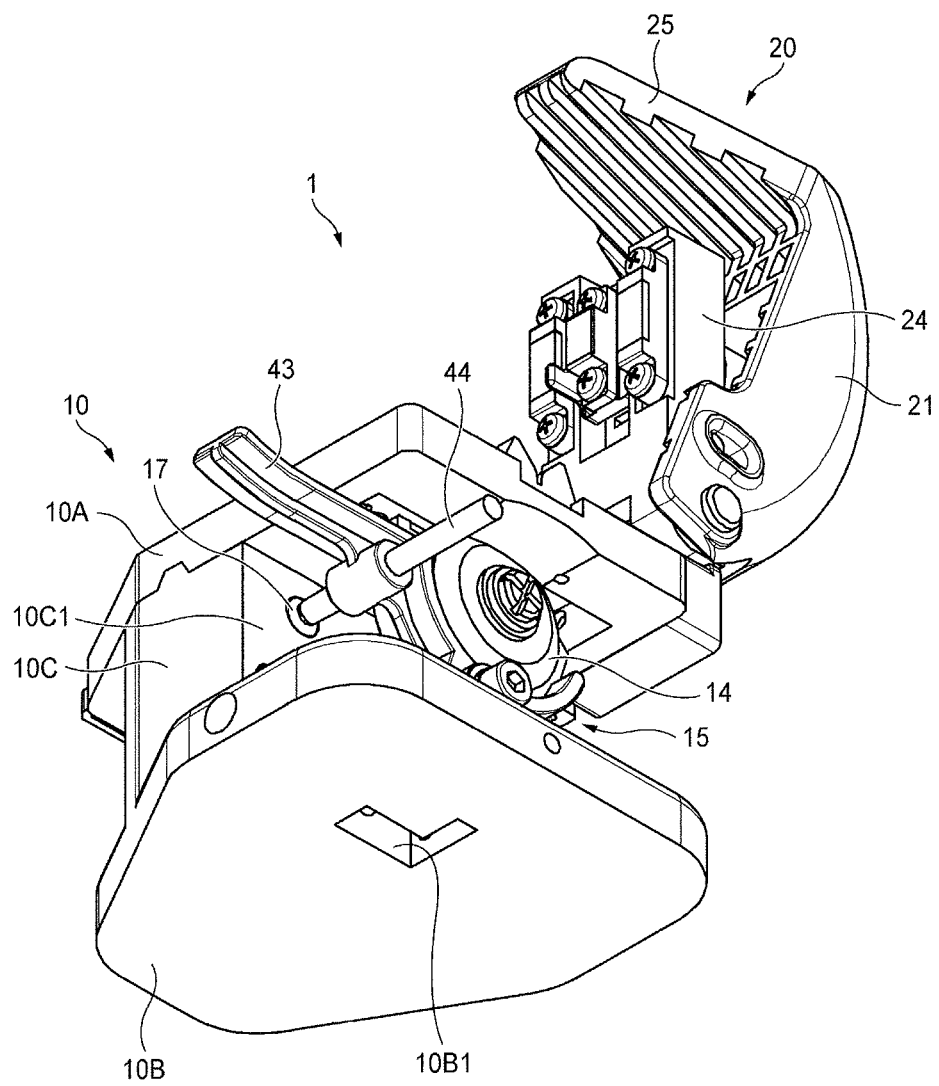
FIG. 6 is a bottom perspective view when a rotational lever of a holding member of a blade member is lifted upward in a state where the clamping cover is open.

If the cutting operation of the glass fiber portion is completed and the hand of the operator is released from the arm member 21, as illustrated in FIG. 6, the clamping cover 20 (arm member 21 and the mounting member 24) is opened by the biasing force of the spring member provided between the arm member 21 and the mounting member 24. Thereafter, the operator moves the rotational lever 43 or the rod 44 of the holding member 15 upward and thereby the holding member 15 that holds the blade member 14 is moved to a standby position in which the rotational lever 43 abuts against the top plate portion 10A.

Moreover, instead of the rod 44, the rotational lever 43 or a part of the holding member 15 protrudes on a side opposite to a surface 10C1 of the column portion 10C of the body portion 10 in which the blade member 14 and the holding member 15 are provided. That portion may be used as an operation portion in a case of moving the holding member 15.

The optical fiber cutting apparatus 1 described above includes the body portion 10 on which the optical fiber is mounted, the clamping cover 20 that is rotatably connected to the body portion 10 and fixes the optical fiber between body portion and the clamping cover by being rotated toward the body portion 10, the blade member 14 that flaws the fixed glass fiber portion of the optical fiber, and the holding member 15 that is mounted on the body portion 10 and holds the blade member 14. The clamping cover 20 presses the holding member 15 and thereby the blade member 14 is moved in an arc shape, and flaws the glass fiber portion. Specifically, the clamping cover 20 has the lever pressing portion 25 that is protruded on the body portion 10 side in a state where the clamping cover 20 faces the body portion 10. The holding member 15 has the rotational lever 43 that is pressed by the lever pressing portion 25 when the clamping cover 20 rotates toward the body portion 10. According to the configuration, it is possible to perform a series of steps at a time which are configured of fixing the optical fiber between the body portion 10 and the clamping cover 20, causing the blade member 14 to be moved in an arc shape, flawing the glass fiber portion of the optical fiber, and cutting the glass fiber portion with a simple configuration of only rotating the clamping cover 20 toward the body portion 10. Therefore, it is possible to have a configuration in which the operator rotates the clamping cover 20 of the optical fiber cutting apparatus 1 using one hand while pressing the optical fiber using the other hand and thereby the operator can perform the cutting operation of the optical fiber. Therefore, the cutting operation is simplified and it is possible to shorten the cutting operation.

Moreover, as illustrated in FIG. 6, a magnet 17 is provided in the upper portion side of the surface 10C1 of the column portion 10C of the body portion 10 in which the blade member 14 and the holding member 15 are provided. After the cutting operation of the optical fiber, if the operator moves the rotational lever 43 or the rod 44 upward, one end portion of the rod 44 is attached to the magnet 17 to be held. Therefore, it is possible to fix the holding member 15 in the standby position in which the rotational lever 43 abuts against the top plate portion 10A. Therefore, it is possible to prevent form the flaw on the glass fiber portion of the optical fiber due to an unexpected arc movement of the blade member 14.

Moreover, instead of the rod 44, the rotational lever 43 or a part of the holding member 15 is protruded on the surface 10C1 side, or the rotational lever 43 or the holding member 15 approaches the surface 10C1, and thereby the portion thereof may be attached to the magnet 17 to be held.

Figure 7:
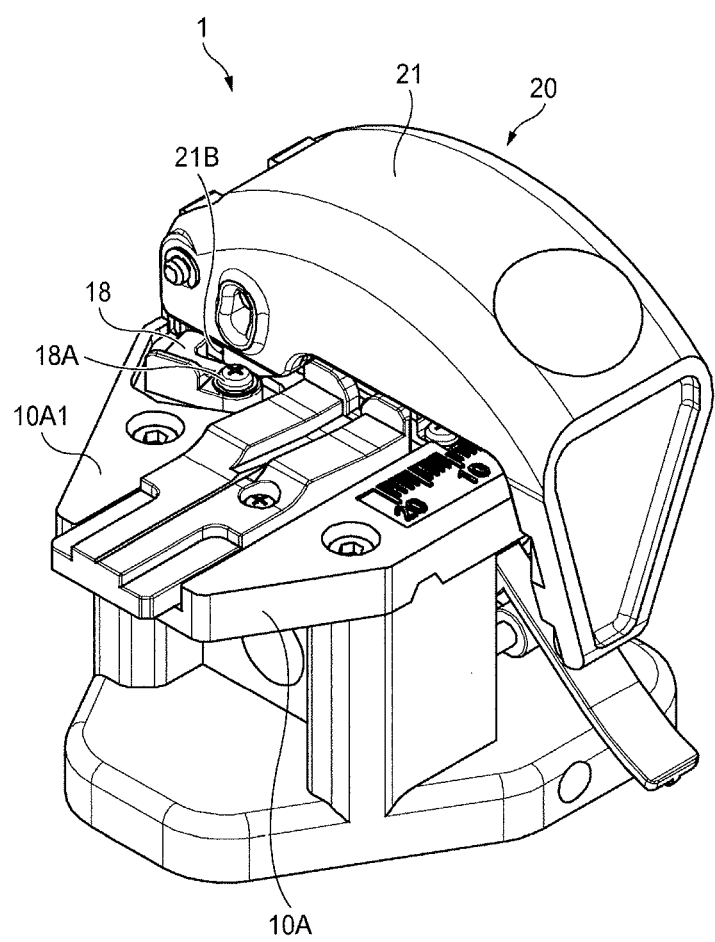
FIG. 7 is a rear perspective view of a state where the clamping cover is locked by a lock member.
Figure 8:
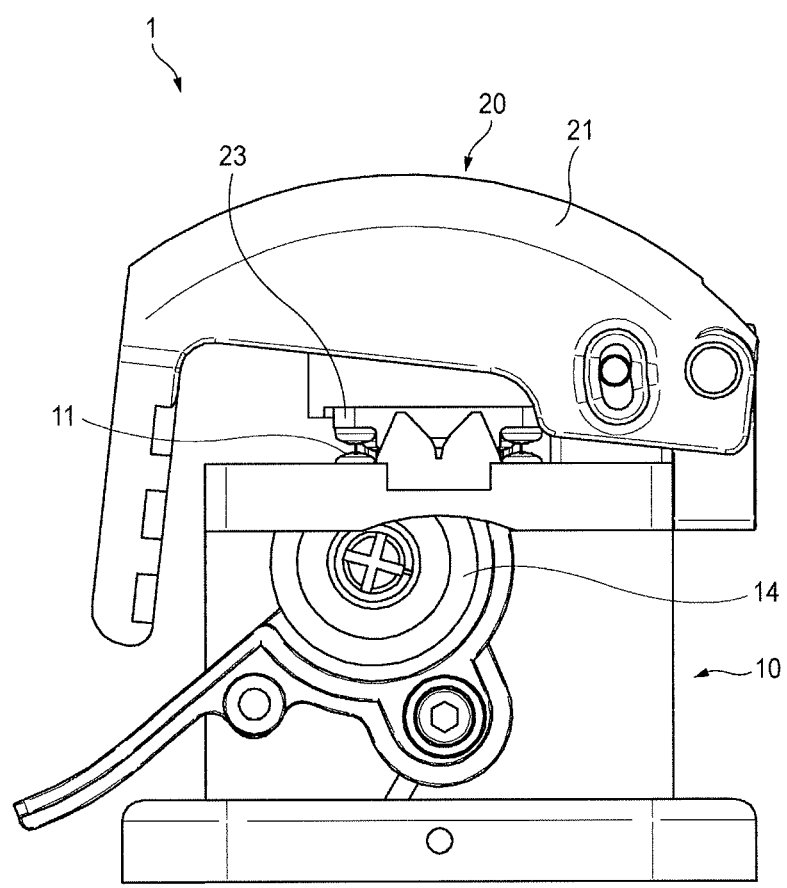
FIG. 8 is a right side view of the state illustrated in FIG. 7.

In addition, as illustrated in FIG. 7, a lock device 18 is provided in the vicinity of the rotation member 22 of the clamping cover 20 on the upper surface 10A1 of the top plate portion 10A. In addition, a notch 21B (see FIGS. 1 and 2) is provided in a position facing the lock device 18 in the arm member 21. The lock device 18 is rotatable around a screw 18A and a tip of the lock device 18 is capable of inserting into the notch 21B. As described above, as illustrated in FIG. 8, the arm member 21 can be fixed in a semi-open state so as not to be in a fully-open state by inserting the tip of the lock device 18 into the notch 21B of the arm member 21. As described above, the blade member 14 protruding from the lower and upper fixing member 12 and 23 or the exposure hole 16 cannot be exposed by causing the optical fiber cutting apparatus 1 to be in the semi-open state using the lock device 18. Therefore, it is possible to safely carry the optical fiber cutting apparatus 1 without housing the optical fiber cutting apparatus 1 within a dedicated housing case and the like. In addition, it is possible to prevent the rubber material of the lower fixing member 12 from coming into contact with the rubber material of the upper fixing member 23 with a strong force. Therefore, it is possible to reduce a possibility of deformation of the upper and lower rubber materials even if the clamping cover 20 is closed in the semi-open state for a long period of time.

Moreover, in the embodiment described above, the glass fiber portion is fractured by pressing the glass fiber portion of the optical fiber in which the flaw is formed by the blade member 14 by the fracture member 26, but it may not be necessarily configured to be fractured by the fracture member 26. That is, a height of the blade member 14 that cuts the glass fiber portion is adjusted and thereby the blade member 14 is enters deeply the glass fiber portion and the blade member 14 can also cut the glass fiber portion in the middle of being moved in an arc shape.

Next, a method for adjusting the position of the blade member 14 with respect to the clamping surface 12P on which the optical fiber is mounted, which is performed by the adjusting lever 45, will be described with reference to FIGS. 9 to 11.

Figure 9:
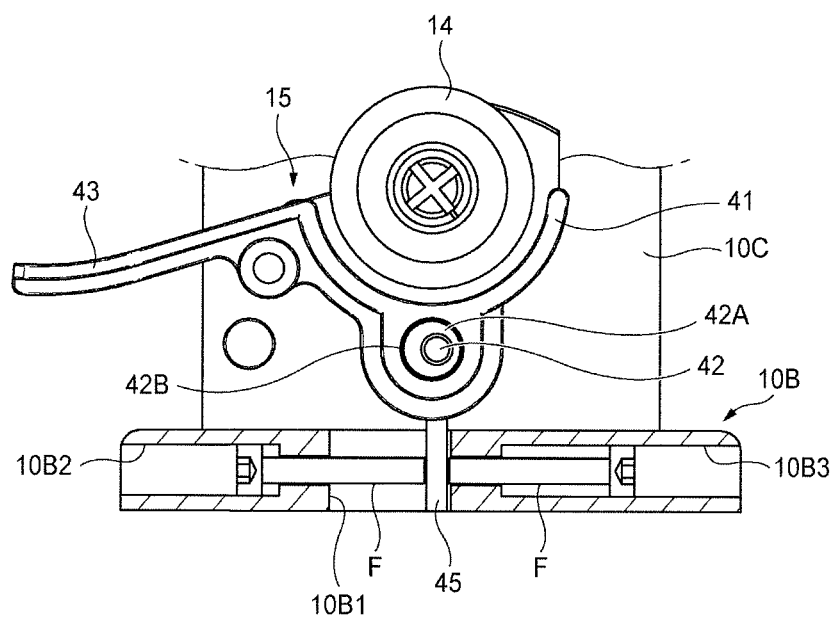
FIG. 9 is a partial sectional view illustrating a position adjusting mechanism of the blade member.
Figure 10:
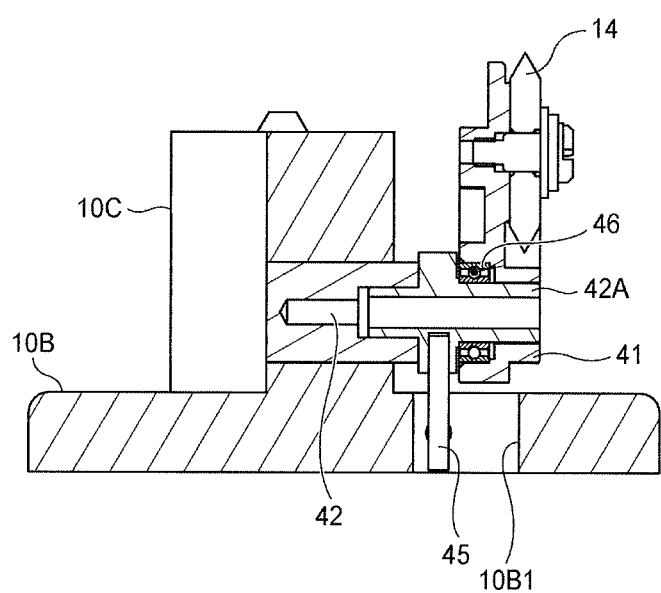
FIG. 10 is a vertical sectional view of a center of FIG. 9.

FIG. 9 is a partial sectional view illustrating a position adjusting mechanism of the blade member and FIG. 10 is a vertical sectional view of a center of the position adjusting mechanism illustrated in FIG. 9.

As illustrated in FIG. 9, the rotational shaft 42 of the holding member 15 holding the blade member 14 includes an eccentric cam device. That is, the rotational shaft 42 has an eccentric cam region 42A having a rotational center shaft different from a rotational center shaft of the rotational shaft 42. That is, a distance of an outer periphery (cam surface 42B) of the eccentric cam region 42A from the rotational center shaft of the rotational shaft 42 is changed. As illustrated in FIG. 10, a bearing 46 is mounted on a circumference of the cam surface 42B and the blade holding portion 41 is fixed to a circumference of the bearing 46. That is, the blade holding portion 41 is rotatably connected to the rotational shaft 42 via the bearing 46.

In addition, as illustrated in FIGS. 9 and 10, the adjusting lever 45 is fixed so as to protrude downward from a portion of the eccentric cam region 42A which is closer toward the column portion 10C side of the body portion 10 than a portion on which the bearing 46 is mounted. That is, the adjusting lever 45 has the same rotational center shaft as the rotational center shaft of the eccentric cam region 42A and is integrally rotatable with the eccentric cam region 42A. In FIG. 9, as an example, the adjusting lever 45 is positioned so as to extend in a vertical direction. A tip of the adjusting lever 45 penetrates an opening portion 10B1 provided in the bottom plate portion 10B of the body portion 10. The opening portion 10B1 is cut in a long hole shape along a radial direction of the blade member 14. Small-diameter opening portions 10B2 and 10B3 which are opened along the radial direction of the blade member 14 are further provided in the bottom plate portion 10B. The small-diameter opening portions 10B2 and 10B3 respectively communicate with the opening portion 10B1 at both ends of the opening portion 10B1. A adjusting screw F is inserted into each of the small-diameter opening portions 10B2 and 10B3. The adjusting screws F can be positioned such that the tip of the adjusting lever 45 is sandwiched between tip portions thereof.

Figure 11:
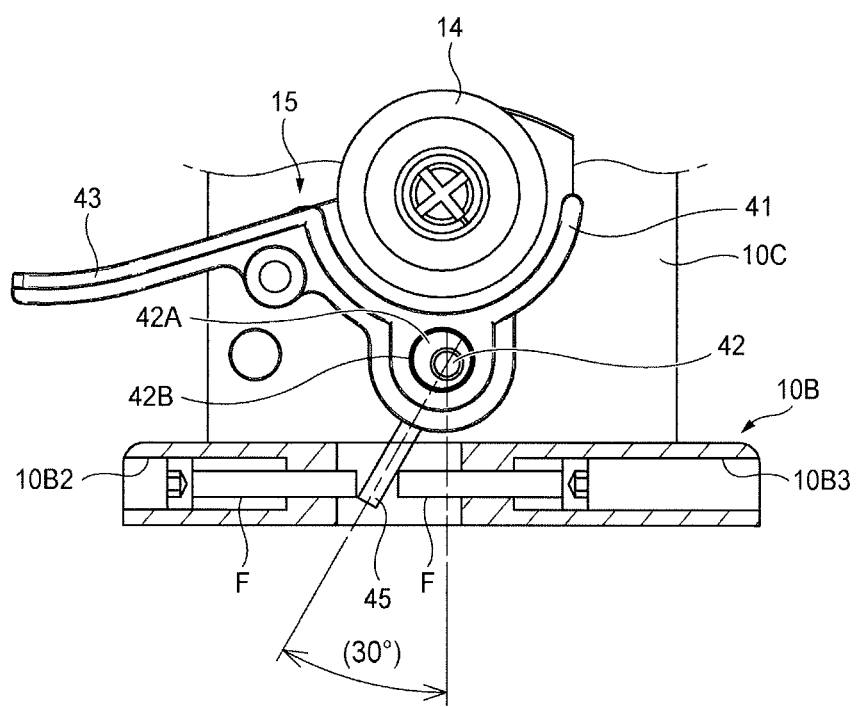
FIG. 11 is a partial sectional view illustrating a state where an adjusting lever of the position adjusting mechanism is adjusted.

FIG. 11 is a partial sectional view illustrating a state where the adjusting lever 45 is adjusted.

The adjusting lever 45 that is inserted into the opening portion 10B1 is capable of moving in the opening portion 10B1 along the radial direction of the blade member 14 by moving at least one of the adjusting screws F along the small-diameter opening portions 10B2 and 10B3. In this example, the adjusting lever 45 is moved, for example, from the position illustrated in FIG. 9 to the position illustrated in FIG. 11 by loosening the adjusting screw F inserted into the small-diameter opening portion 10B2 that is provided on the left side in FIGS. 9 and 11, and tightening the adjusting screw F inserted into the small-diameter opening portion 10B3 provided on the right side. As described above, the adjusting lever 45 is moved in the rotating direction of the rotational shaft 42 and thereby the eccentric cam region 42A to which the adjusting lever 45 is fixed is also rotated around the rotational shaft 42. The eccentric cam region 42A is configured of the eccentric cam having a center different from the rotational center of the rotational shaft 42. Therefore, the eccentric cam region 42A is rotated, and thereby a distance from the rotational center of the rotational shaft 42 to the cam surface 42B in the vertical direction is changed. As a result, the position of the blade holding portion 41 connected to the circumference of the cam surface 42B via the bearing 46 is lifted. According to the configuration, the position of the blade member 14 that is held on the blade holding portion 41 can be lifted by moving the adjusting lever 45 in the rotating direction of the rotational shaft 42 by the adjusting screws F. For example, as illustrated in FIG. 11, in a case where the adjusting lever 45 is moved by 30 degrees from the vertical direction in the clockwise direction by the rotational movement of the adjusting screw F, the position of the blade member 14 is lifted by 0.25 mm.

As described above, the optical fiber cutting apparatus 1 of the embodiment includes the rotational shaft 42 and the eccentric cam region 42A including an arc having the rotational center different from the rotational center of the rotational shaft 42 as the position adjusting portion that adjusts a relative position of the blade member 14 with respect to the glass fiber portion of the optical fiber fixed by the fixing members 12 and 23. The relative position of the blade member 14 is changed in accordance with the position of the outer peripheral portion of the eccentric cam region 42A. According to the configuration, it is possible to further accurately adjust the position of the blade member 14 and to easily perform a fine adjustment of the blade pressure with a simple structure. In addition, it is possible to further reduce the minimum change amount of the moving amount of the blade member 14 than that of the related art by adjusting the position of the blade member 14 with respect to the clamping surface 12P by rotating the adjusting lever 45 by the rotational movement of the adjusting screw F. It is possible to easily perform a fine adjustment of a contact amount between the optical fiber fixed between the lower and upper fixing member 12 and 23, and the blade member 14.

Moreover, in the embodiment described above, the adjusting screw F is inserted into each of the small-diameter opening portions 10B2 and 10B3, but the invention is not limited to the example. For example, a compression spring may be provided at any one of the small-diameter opening portions 10B2 and 10B3 as a pressing portion for pressing the adjusting lever 45. The compression spring as the pressing portion moves the adjusting lever 45 so as to rotate the adjusting lever 45 in a direction opposite to the rotating direction of the eccentric cam region imparted by the movement of the adjusting screw F inserted into the other small-diameter opening portion. Since the movement in the direction opposite to the moving direction of the adjusting screw is imparted to the eccentric cam region 42A by the compression spring, it is possible to accurately perform the adjustment of the blade pressure.

In addition, in the embodiment described above, the position of the blade member 14 is adjusted by rotating the eccentric cam region 42A by moving the adjusting lever 45 protruding below from the eccentric cam region 42A, but the invention is not limited to the example. For example, the position of the blade member 14 may be adjusted by directly rotating the eccentric cam region 42A without providing the adjusting lever 45.

In addition, in the embodiment described above, the eccentric cam region 42A or the adjusting lever 45 is provided as the device for adjusting the position of the blade member 14 that forms the flaw on the glass fiber portion of the optical fiber with the arc movement, but the invention is not limited to the example. For example, the optical fiber cutting apparatus has a holding member including a slide device capable of linearly slide-moving and may be provided with the position adjusting mechanism such as the eccentric cam device, the adjusting lever, and the adjusting screw of the embodiment described above as a unit that is held in the holding member and adjusts the position of the blade member forming the flaw on the optical fiber by the linear sliding movement. Therefore, it is possible to perform a more accurate position adjustment even in the blade member forming the flaw on the optical fiber by the linear movement.

In the foregoing, the present invention has been described in detail with reference to specific embodiments. However, those skilled in the art will appreciate that various changes and modifications may be made without departing from the spirit and scope of the invention. In addition, numbers, positions, shapes and the like of components as described above are not limited to those of the foregoing embodiments, but may be changed to any numbers, positions, shapes and the like suitable to practice the invention.

What is claimed is:

1. An optical fiber cutting apparatus comprising:
   a body portion on which an optical fiber is mounted;
   a cover member that is rotatably connected to the body portion and fixes the optical fiber between the body portion and the cover member by rotating toward the body portion;
   a blade member configured to form a flaw on a glass fiber portion of the optical fiber which is fixed; and
   a holding member mounted on the body portion, the holding member configured to hold the blade member,
   wherein the cover member includes a lever pressing portion that protrudes toward a body portion side in a state where the cover member is rotated toward the body portion, wherein the holding member includes a rotation lever that is pressed by the lever pressing portion when the cover member is rotated toward the body portion, and wherein the lever pressing portion presses the rotation lever and thereby the blade member imparts an arc movement to form the flaw on the glass fiber portion.

2. The optical fiber cutting apparatus according to claim 1,
wherein the body portion includes a magnet,
wherein the holding member further includes a rod member that penetrates the rotation lever, and
wherein the rotation lever is fixed to a standby position by the rod member being attached to and held by the magnet.

3. The optical fiber cutting apparatus according to claim 1,
wherein the body portion includes a holder fixing portion configured to mount a holder where the optical fiber is housed thereon, a fixing member configured to fix the optical fiber between the cover member and fixing member, and a fiber aligning portion including a groove in which the glass fiber portion is housed.

4. The optical fiber cutting apparatus according to claim 1,
wherein the body portion includes a lock device configured to fix the cover member in a semi-open state.

5. The optical fiber cutting apparatus according to claim 3,
wherein the body portion includes a lock device configured to fix the cover member in a semi-open state.

* * * * *